(12) United States Patent
Jain et al.

(10) Patent No.: US 6,311,218 B1
(45) Date of Patent: *Oct. 30, 2001

(54) METHOD AND APPARATUS FOR PROVIDING SECURITY IN A STAR NETWORK CONNECTION USING PUBLIC KEY CRYPTOGRAPHY

(75) Inventors: Vipin Kumar Jain, Santa Clara; Danny M. Nessett, Fremont; William Paul Sherer, Danville, all of CA (US)

(73) Assignee: 3Com Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/955,869

(22) Filed: Oct. 28, 1997

Related U.S. Application Data (63) Continuation-in-part of application No. 08/866,818, filed on May 30, 1997, now Pat. No. 6,021,495.
(60) Provisional application No. 60/032,124, filed on Dec. 5, 1996, and provisional application No. 08/733,358, filed on Oct. 17, 1996, now abandoned.

(51) Int. Cl.[7] .................................................... G06F 15/16
(52) U.S. Cl. .................. 709/229; 709/225; 709/226; 709/227; 709/228; 713/200-202
(58) Field of Search .................................. 713/200, 201, 713/202; 709/225–229; 370/427, 446; 380/23, 25

(56) References Cited

U.S. PATENT DOCUMENTS

| | | | |
|---|---|---|---|
| 4,896,319 | * | 1/1990 | Lidinsky et al. ..................... 370/427 |
| 5,222,140 | * | 6/1993 | Beller et al. ........................... 380/30 |
| 5,278,904 | * | 1/1994 | Servi ..................................... 380/23 |
| 5,537,099 | * | 7/1996 | Liang ............................. 340/825.07 |
| 5,546,463 | * | 8/1996 | Caputo et al. ......................... 380/25 |
| 5,563,950 | * | 10/1996 | Easter et al. ............................ 380/3 |
| 5,694,471 | * | 12/1997 | Chen et al. ............................ 380/25 |
| 5,778,072 | * | 7/1998 | Samar .................................... 380/30 |
| 5,805,801 | * | 9/1998 | Holloway et al. .................. 713/201 |
| 5,815,664 | * | 9/1998 | Asano .................................. 709/227 |
| 5,936,149 | * | 8/1999 | Fischer ................................. 73/1.43 |

* cited by examiner

Primary Examiner—Zarni Maung
Assistant Examiner—Nabil El-Hady
(74) Attorney, Agent, or Firm—Wagner, Murabito & Hao LLP (57) ABSTRACT

An intermediate system authenticates using cryptography. The authentication routine requires a user to supply a secret known only to the user before allowing data to be transmitted. The secret is never transmitted. The invention may be incorporated into an intermediate system, into intermediate system software, or into application specific integrated circuits designed for use in an intermediate system. The invention may include components that interact specifically with installed components in an end system or elsewhere in a network.

22 Claims, 6 Drawing Sheets

| LAYER NAME(NUMBER) | DEVICES | DATA | PROTOCOLS |
|---|---|---|---|
| HIGHER LAYER PROTOCOLS ||||
| APPLICATION LAYER (5) | | FILES | FTP, HTTP |
| TRANSPORT LAYER (4) | ROUTERS | ROUTING PACKETS | TCP, UDP |
| ROUTING LAYER (3) | ROUTERS | ROUTINGS PACKETS | IP |
| DATA LINK LAYER (2) | BRIDGES | PACKETS | ETHERNET |
| PHYSICAL LAYER (0.1) | REPEATERS | BITS | ETHERNET |

HIGH (top) / LOW (bottom)

METHOD AND APPARATUS FOR PROVIDING SECURITY IN A STAR NETWORK CONNECTION USING PUBLIC KEY CRYPTOGRAPHY

This application is a continuation in part of patent application Ser. No. 08/866,818, entitled METHOD AND APPARATUS FOR AUTHENTICATION PROCESS OF A STAR OR HUB NETWORK CONNECTION PORTS BY DETECTING INTERRUPTION IN LINK BEAT, filed May 30, 1997, U.S. Pat. No. 6,021,495 and incorporated herein by reference for all purposes.

This application claims priority from provisional patent application Ser. No. 60/032,124, filed Dec. 5, 1996.

Related disclosure is discussed in co-assigned patent application Ser. No. 08/733,358, filed Oct. 17, 1996, now abandoned, which is a continuation of U.S. Pat. No. 5,568,469, filed Sep. 27, 1994 and issued Oct. 22, 1996 incorporated herein by reference.

BACKGROUND OF THE INVENTION

The current invention relates to the field of electronic circuits. More particularly, the current invention relates to improvements in networked computer environments and has particular applications to the transmission of information between digital devices over a communications medium. A wide variety of computer systems and networks exist, each having variations in particular implementations. The present invention will be described with reference to particular types of systems for clarity but this should not be taken to limit the invention, and it will be apparent to those of skill in the art that the invention has applications in many different types of computer systems. The invention therefore should not be seen as limited except as specifically herein provided.

Relevant and well-known network background information is discussed in parent application Ser. No. 08/866,818, U.S. Pat. No. 6,021,495 as incorporated above by reference and will not be repeated in detail here. As discussed in that application, network modularity and flexibility have created increased security concerns and a need to require more complete authentication of a user on a node before allowing that node to see or transmit network traffic. The parent application discusses mechanisms of providing increased network security using link-beat detection at a star intermediate system and a variety of authentication schemes that are called whenever an unauthenticated user connects or reconnects to the star device. One aspect of that invention involves a star system requiring a user to supply some type of password to the star system for authentication.

However, in some applications it will be desirable to provide a system wherein a user's password is not transmitted over the network so that the password cannot be captured by a sniffing device. What is needed, therefore, is a user authentication system that does not require that a user password be transmitted on the network but prevents unauthorized equipment or an unauthorized person from connecting to a network and listening-in on network traffic and verifies the identity of a user prior to allowing the user to send or receive data on a network.

SUMMARY OF THE INVENTION

In general terms, the present invention comprises techniques and devices for a computer network with improved security. According to the invention, network intermediate systems (IS) that are connected in a star or similar topology, such as repeaters or switches, that provide point-to-point connections to one or more ESs are enabled to authenticate a user at the first connection point the user makes with the network. The intermediate systems provide an authentication routine every time an ES makes a new connection on a port. According to the invention, an IS will limit the forwarding of packets down its port to an ES and will limit forwarding data from an ES until an authentication process is complete.

A new connection to a point-to-point port on an IS may be detected by the presence or resumption of a link-beat (sometimes referred to as heart-beat) signal that is maintained at the physical layer on the point-to-point connection whenever there is an active node/ES on a port. Authentication is accomplished at a user level through a challenge/response exchange as described below.

Authentication according to the invention is controlled by a first network intermediate system (star device) to which an end system connects. Some parts of the authentication may be performed locally and, in an alternative embodiment, the star device may communicate with one or more other devices on the network to complete authentication of a new user.

According to a further embodiment of the invention, at power up or when a star device detects a new connection on a port, the star device initiates an authentication routine to reliably verify a user. To do this, a star device, according to one embodiment, may use a directory server existing somewhere on the network to retrieve a certificate or a certification path for the user based on an identification supplied by a user. The certificate or certification path is decoded into a public key for a particular user. The invention uses a modified public key cryptography and a challenge response scheme to authenticate a user.

In one embodiment, once a public key for a particular user has been decoded, a challenge is generated and is encrypted with the user's public key. The encrypted challenge is then sent to the end system. The user must then supply his private key to decrypt the challenge at the end system and the end system returns the decrypted challenge to the star device. The invention compares the response with the challenge it originally generated and based on the results of the match, authenticates the port.

In an alternative embodiment, a challenge is generated and presented to the user, and the user then encrypts the challenge using his private key and returns the encrypted challenge as a response. A public key for a particular user is then used to decrypt the challenge, either at the star device or the security server. The invention compares the decrypted response with the challenge it originally generated and based on the results of the match, authenticates the port.

In a further embodiment, if the star device is restricted in terms of the computation power it can devote to authentication, a security server performs the computation-intensive cryptography functions. The star device in this case receives the user name from the end system and requests the security server to compute the challenge for the user. The security server gets the user certification path, generates a challenge, encrypts it using the user's public key and sends both the challenge and encrypted challenge to the star device. The star device then sends only the encrypted challenge to the end system for decryption. When the end system responds with the decrypted challenge, the star device compares the returned challenge with the unencrypted original challenge supplied by the security server and allows or disallows network access to the user based on the comparison results. In this embodiment, it is important that the connection between the star device and security server be secure such that an intruder cannot capture the challenge and encrypted challenge. This may be done by having the security server directly coupled or integrated with the star device. Alternatively, messages using message integrity and confidentiality mechanisms, as are known in the art, can be used to ensure that the message from the security server to the star device is generated by the security server.

Specific aspects of the invention will be better understood upon reference to the following detailed description and in conjunction with the drawings.

DETAILED DESCRIPTION OF SPECIFIC EMBODIMENTS

Figure 1:
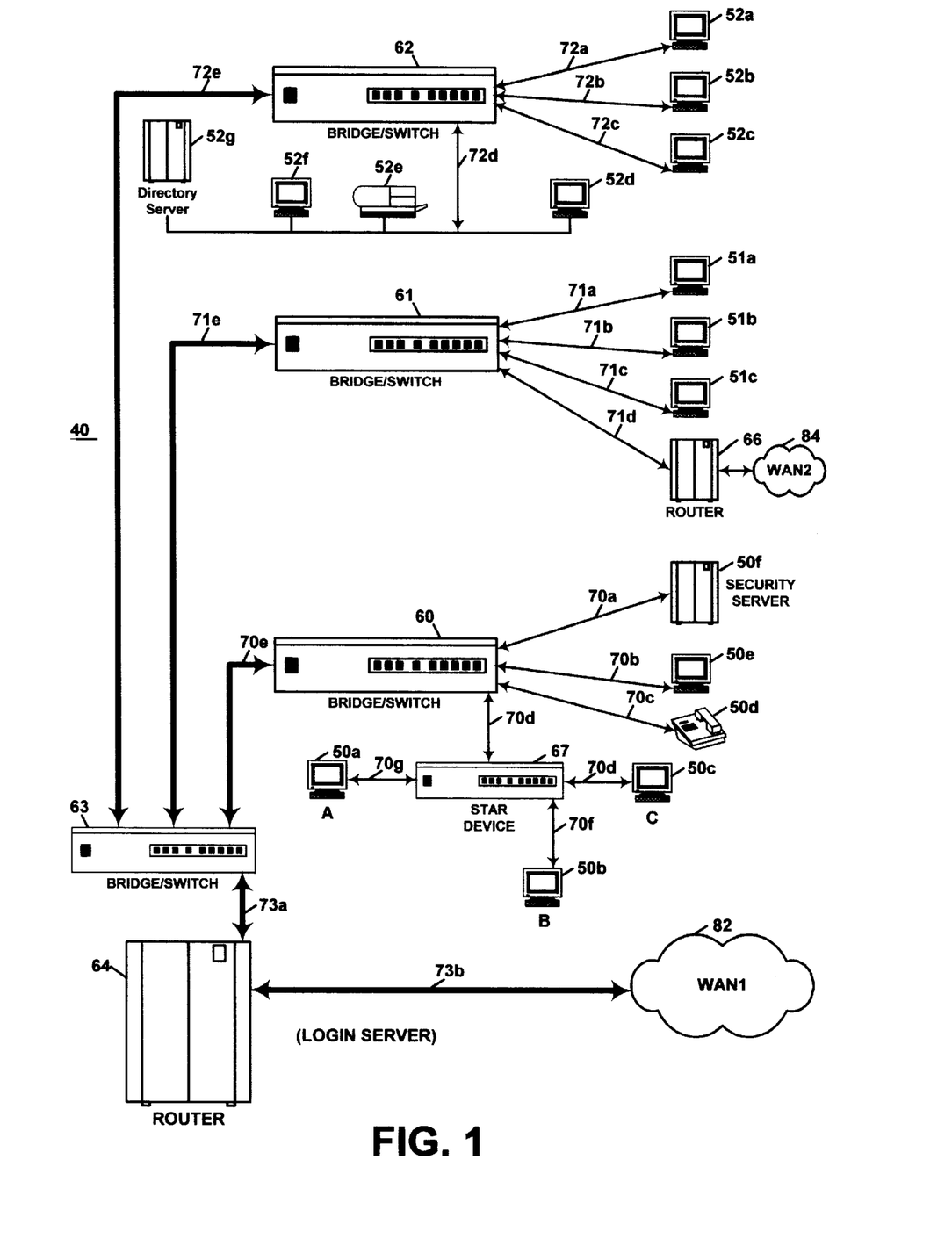
FIG. 1 is a diagram of a moderate sized network of one type in which the invention may be effectively employed.

FIG. 1 illustrates a local area network (LAN) 40 of a type that might be used today in a moderate-sized office or academic environment and as an example for discussion purposes of a system in which the present invention may be effectively employed. Typical modern LANs such as 40 are comprised of one to many LAN intermediate systems (ISs) such as ISs 60–62 and 67 that are responsible for data transmission throughout the LAN and a number of end systems (ESs) such as ESs 50a–e, 51a–c, and 52a–f, that can represent end user equipment or other end nodes. FIG. 1 also shows a security server 50f and a directory server 52g which, according to embodiments of the invention as described below, are used by a star device to authenticate new connections.

The ESs may be familiar end-user data processing equipment such as personal computers, workstations, and printers and additionally may be digital devices such as digital telephones or real-time video displays. Different types of ESs can operate together on the same LAN. In one type of LAN, LAN ISs 60–61 are referred to as bridges and WAN ISs 64 and 66 are referred to as routers, and IS 67 is referred to as a repeater, however many different LAN configurations are possible, and the invention is not limited in application to the network shown in FIG. 1.

The LAN shown in FIG. 1 has segments 70a–g, 71a–e, and 72a–e, and 73a–b. LANs also may contain a number of repeaters, such as repeater 67. Repeaters configured in a star topology, such as 67, are also referred to as hub repeaters. (The terms hub or star is a term used in networking that sometimes indicates either a switch/bridge layer 2 device or a repeater layer 1 device depending on the context.)

The term node is often used in describing networks to indicate any transmitter or receiver in the network. Repeater 67, for example, is a network intermediate system connected to four nodes, three of those being end systems and one being a different intermediate system bridge 60.

Each of the ISs and ESs in FIG. 1 includes one or more adaptors and hardware or software instructions sometimes referred to as drivers.

Figure 3:
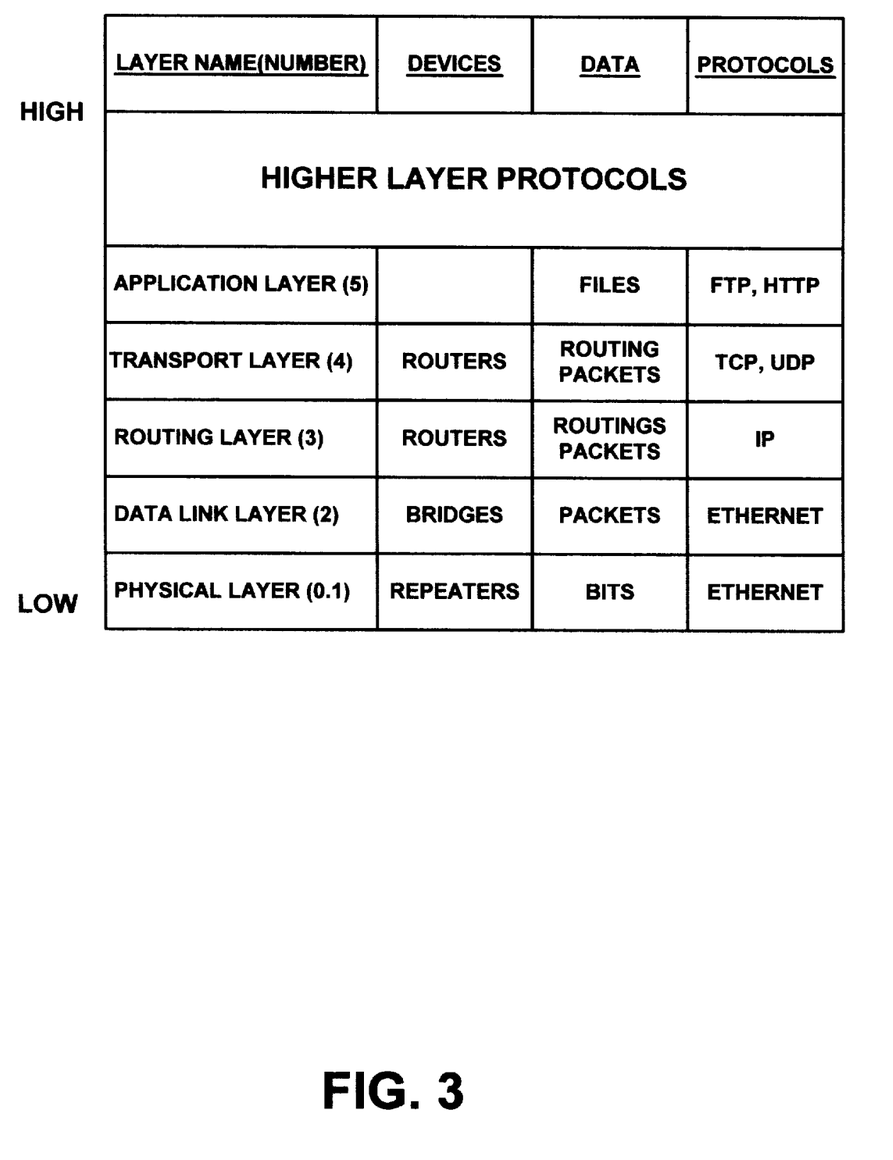
FIG. 3 is a diagram illustrating a layered network protocol.

As is known in the art, devices shown in FIG. 1 operate according to a layered network protocol suite, an example of which is shown in FIG. 3.

Figure 2:
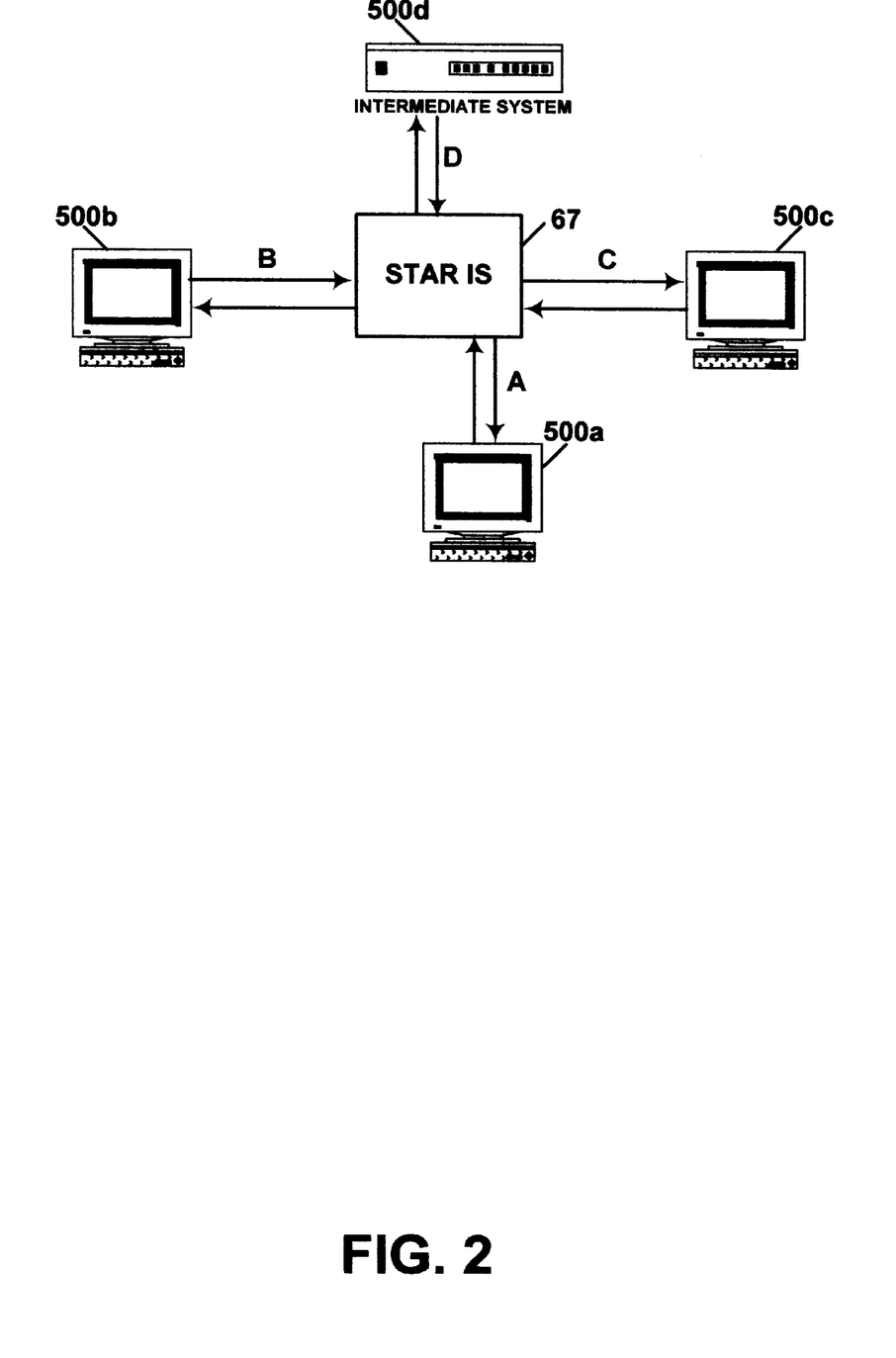
FIG. 2 is a diagram illustrating an IS connecting four transmitter/receivers in a star/hub connection to illustrate aspects of the invention.

FIG. 2 is a generalized and simplified block diagram of a star device IS connected to three ESs and one other IS that will be used to illustrate the invention. The star IS 67 may represent either a repeater at layer 1 or a bridge at layer 2 or other network intermediate systems according to different network configurations.

Figure 4:
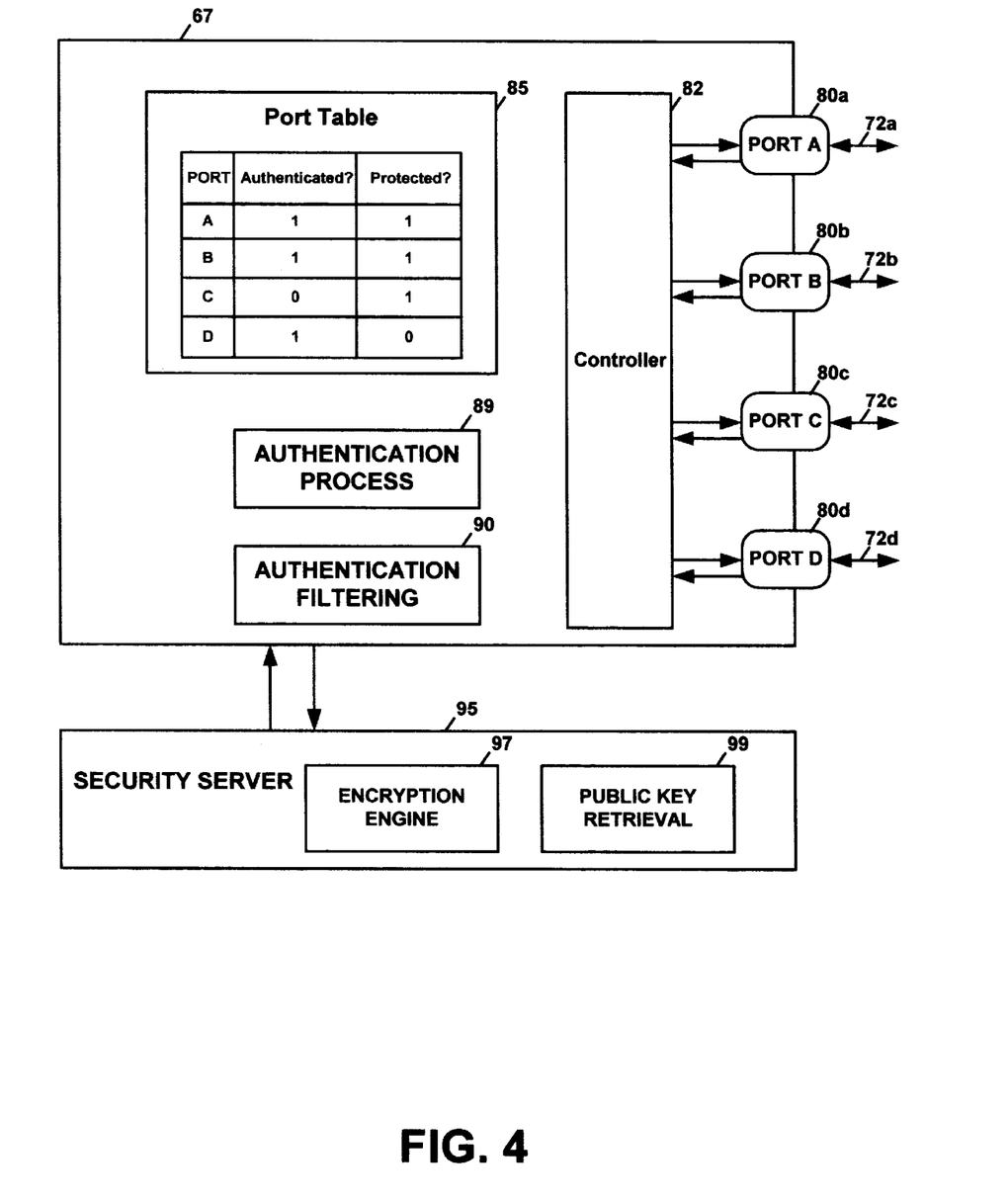
FIG. 4 is a block diagram of an IS star device according to one specific embodiment of the invention.

FIG. 4 is a block diagram representing an IS internal structure according to one embodiment of the invention. As discussed in the earlier application, in one embodiment, a star device according to the invention maintains state regarding which of its connected ports are authenticated and which are not and detects when the node connected to a port is disconnected. An authentication process is called whenever a physical connection is detected on an unauthenticated port or whenever any attempt is made to transmit data on an unauthenticated port. In one embodiment, network transmission is limited on a port until a port connection has been authenticated.

FIG. 4 also shows security server 95. According to one embodiment of the invention, security server 95 is supplied with a user identification from IS 67 and then presents to IS 67 an encrypted challenge and an unencrypted challenge for performing authentication as described below. Security server 95 may be a process running on the same hardware as IS 67 or may be a separate device on the network such as server 50f shown in FIG. 1.

Security server 95 performs a type of two-key encryption in engine 97 using a user's "public" key, as is known in the art, after first retrieving a user's public key using retrieval engine 99. Public key encryption uses a particular receiver's public key to encrypt a message. That encrypted message can then be decrypted only by a matching private key, which is generally known only to the owner of the private key. In one embodiment of the invention, the authenticity of a retrieved public key is guaranteed by using a hierarchical certification path and certification authority as is known in the art. The certificate path may be stored along with other user configuration data in a directory server 52g, which may then act as one of the certification authorities on the network.

Physical Layer Linkbeat Detection

In contrast to prior art network and LAN systems, an embodiment of the present invention authenticates a user at a first LAN intermediate system to which the user is connected on a per port basis, then authenticates a user each time there is any interruption in the physical link with an end system connected to a particular network port. In order to accomplish this, the invention uses a mechanism at the physical layer to determine whether an end system is newly connected to a port, rebooted, or power cycled at a port.

In one specific embodiment, point-to-point ethernet linkbeat, as is known in the art, is used to determine whether there has been any interruption in the physical connection to an end system. As is known in the art, point-to-point ethernet defines a linkbeat packet whereby, during periods of silence, adapters at both ends of a point-to-point ethernet connection send periodic very small packets, called linkbeat packets, to inform the adapter at the other end that an adapter is connected to a port. In prior art systems, the presence or absence of this linkbeat packet is used only at the lowest physical layer to manage transmissions and is not made known to higher layer protocols.

According to the current invention, however, a controller, such as 82, is enabled to respond to an interruption in the linkbeat on a port by resetting an authentication bit in a port table 85.

A resumption of linkbeat on a port or an attempt to send data on a port that is unauthenticated will be detected by controller 82 and will cause the controller to initiate an authentication process 89 as described below.

Other mechanisms for detecting the interruption in a physical connection are possible for use in conjunction with the invention, and according to the invention, any mechanism appropriate for a particular physical interface that can sense a disconnection from the physical interface or a reboot of an end system connected to the physical interface may be used with the authentication scheme of the invention.

Authenticating a Port

According to the invention, an authentication process is called whenever data transmission is attempted linkbeat is resumed on an unauthenticated port. In one specific embodiment, the authentication process takes place according to the flow chart shown in FIG. 5.

Figure 5:
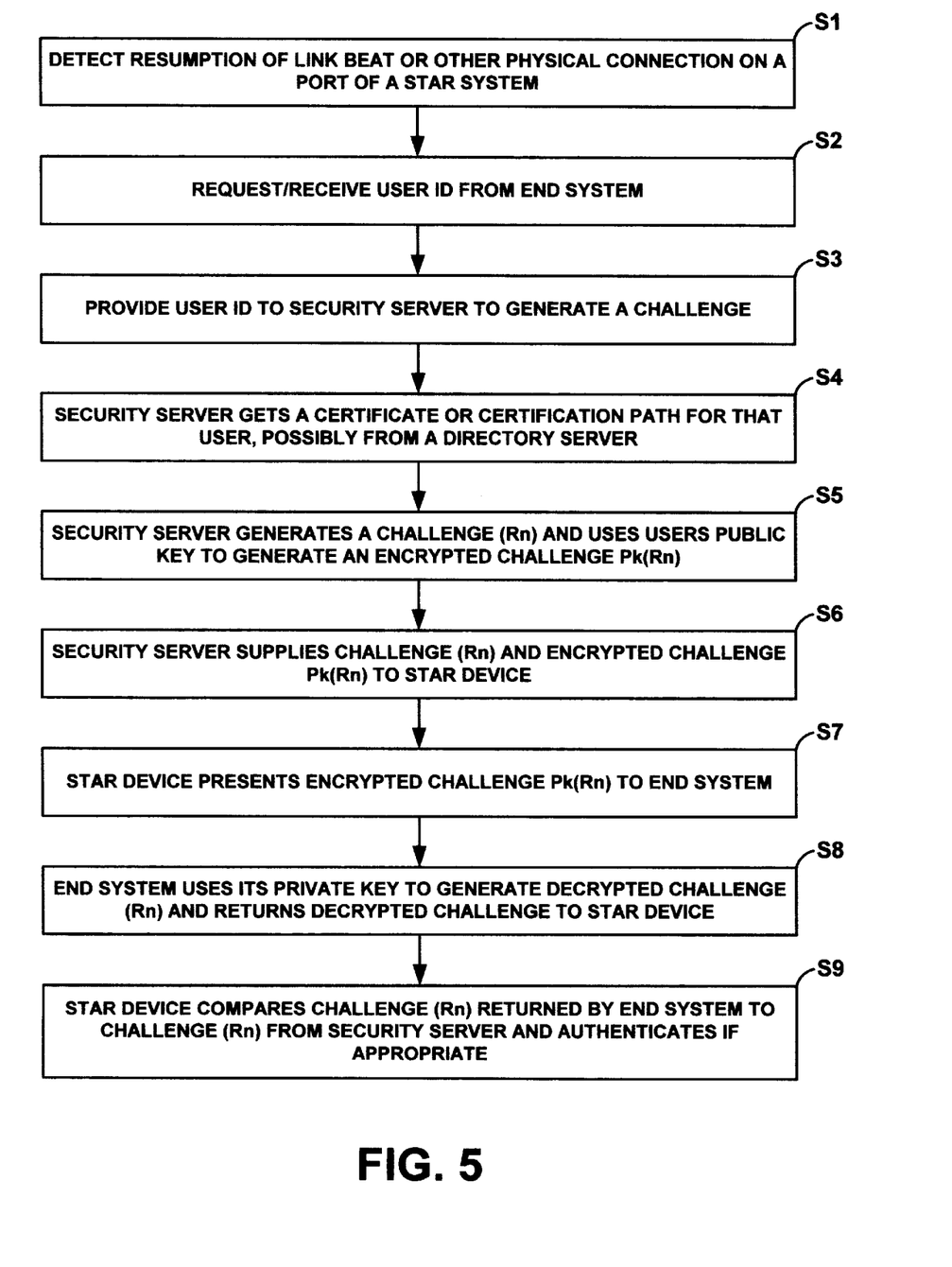
FIG. 5 is a flow chart illustrating user authentication according to one embodiment of the invention.
Figure 6:
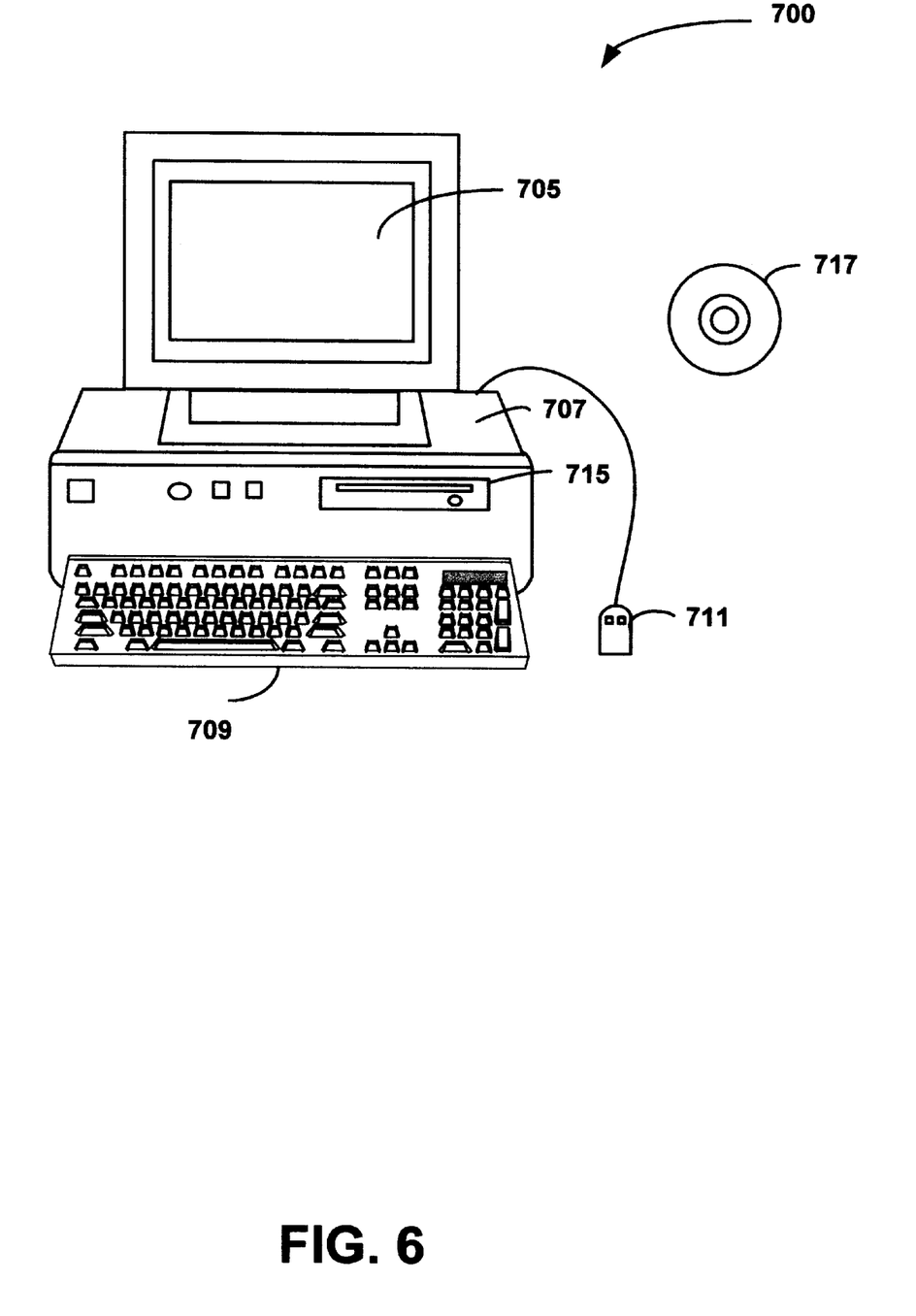
FIG. 6 is a diagram of a computer system with a fixed medium 717 which may be used to implement one embodiment of the invention.

According to this embodiment, when authentication process 89 is invoked by controller 82, the authentication process will cause a message to be sent to an unauthenticated end system, such as 50a requesting an identification that will be used for authentication (referred to herein as a user id). The user id is then provided to a security server 95, which is a process accessible to device 67, either running on that device or elsewhere on the network.

In one embodiment, it is the task of security server 95 to generate both a challenge to be presented to an end system and an expected response from the end system. In an alternative embodiment, the star device will generate the challenge and the security server will generate an expected response.

Separating out the task of generating a challenge/expected response to a stand-alone security server has the advantage of moving this computationally demanding task off of the star device.

In order for the security server to encrypt the challenge, it must have a public key for the user. In one embodiment, the security server looks up a public key for a user using a directory server or other data repository, which is generally a remote server on the network that stores a variety of data about a user. The security server may also store the public key locally and may also cache public keys for known users for a period of time so that repeated logins by a user at an end system connected to the same security server do not require full fetching and decoding of a certification path from a directory server.

In one embodiment, the authentication process will require a user to have its private key available to decrypt a new challenge each time the authentication process is run rather than allowing the process to be run using a stored password at an end system.

FIG. 5 depicts a flow chart of an authentication method according to the invention. The method begins when an intermediate system detects a new user or connection of a port (S1). The IS requests a user identification from the ES (S2) and provides that identification to a security server (S3). The security server retrieves a certification path from a certification authority (S4) and derives from that a public key (Pk), which it then uses to encrypt a challenge to produce an expected response (Pk(Rn)) (S5). The security server supplies a challenge and an encrypted challenge to a star device (S6), which presents the encrypted challenge to the ES (S7). The ES must then use its private key to decrypt the encrypted challenge and return a response to the star device (S8), which then compares the response to the unencrypted challenge to determine if it should authenticate the port (S9).

In an alternative embodiment of the invention, an unencrypted challenge is presented to the end-system, which must then use its private key to encrypt the challenge, which is returned to the star device. Then either the star device, or a security server, uses a public key for the user to decrypt the response and compares that to the original challenge.

Controlling Access to the Network

An intermediate system, such as 67, with a direct connection to a number of end systems prevents unauthorized access to a network by controlling the flow of network data to end systems that have not been authenticated.

An intermediate system, such as 67, may simply allow no data to flow to and from an end system that is unauthenticated, except for the minimum data needed to interact with the authentication process 89, requiring that an end system be configured such that the authentication may be accomplished prior to any other access to a network being necessary.

An unauthenticated end system may also be allowed limited access to the network in order to accomplish initial network login and configuration prior to completing the authentication process. One mechanism for doing so is to include a protected field in a port table, such as 85, allowing an unauthenticated port to transmit data out of an unprotected port only and remaining restricted until an authentication process is complete.

Intermediate system 67 may also include a further filtering process for unauthenticated ports, allowing packets to flow only to particular addresses or restricting the protocol of packets flowing to or from any unauthenticated port. In such case, a filtering process, such as 90, may be invoked only on unauthenticated ports to examine either addresses or protocols of packets to and from such ports and to prevent the flow of packets that do not meet the filter process definitions. A filtering process may also be invoked on packets in accordance with a Virtual LAN architecture, such as described in co-assigned patent applications Ser. No. 08/502,835, entitled ARCHITECTURE FOR MANAGING TRAFFIC IN A VIRTUAL LAN ENVIRONMENT filed Jul. 14, 1995, U.S. Pat. No. 57S2003 and Ser. No. 08/683,570, entitled VIRTUAL NETWORKING ARCHITECTURE FOR CONNECTIONLESS LAN BACKBONE, filed Jul. 15, 1996, U.S. Pat. No. 6,041,166 incorporated herein by reference to the extent needed to understand this embodiment of the present invention.

In a further embodiment, the invention is designed to work in a managed intermediate system, as is known in the art, managed by a standard network protocol such as SNMP or other network protocol. In such a system, a network manager may set various authenticating characteristics.

In a further embodiment, the invention may network with an intermediate system incorporating an end-system detecting algorithm, allowing the intermediate system to detect whether a single end system is connected to a port, such as port A, or another intermediate system, such as a repeater, is connected to a port.

The invention may be embodied in a set of executable computer program code which may be stored into a fixed computer medium such as a disk, diskette, volatile memory or nonvolatile memory, or any other medium for storing computer code. In such a case, when such instructions are loaded and executed in an appropriately configured network intermediate system, the intermediate system will perform as described herein. A representation of such a system 700 is shown in FIG. 5 containing CPU 707, optional input devices 709 and 711, disk drives 715 and optional monitor 705. Fixed media 717 may be used to program such a system and could represent a disk-type optical or magnetic media or a memory.

The invention also may be embodied within the circuitry of an application specific integrated circuit (ASIC). In such a case, the invention may be embodied in a computer understandable descriptor language which may be used by an ASIC foundry to create an ASIC device that operates as herein described. In this embodiment, computer system 700 may be understood as a computer system for reading instructions from media 717 for the manufacturing of an ASIC.

The invention has now been explained with reference to specific embodiments. Other embodiments will be obvious to those with skill in the art. In particular the invention has application in many different networking environments and schemes. It is therefore intended that the invention not be limited except as indicated in the attached claims.

What is claimed is:

1. In a packet switched network wherein a user can physically connect and disconnect at an arbitrary port of said network, a method for limiting transmission or reception of data from an unauthenticated user, said method not including user identification or port identification information in data packets which are ultimately transmitted in said packet switched network, said method comprising the steps of:

storing in a network intermediate system an indication for each port indicating whether said port is authenticated or unauthenticated;

prior to freely transmitting or receiving network data on any said port, authenticating each said user at the port to which said user is connected, said authenticating of said user by said network intermediate system comprising:

requesting via said network intermediate system an identification from said user connected at said specific port;

receiving at said network intermediate system said identification from said user;

using from said network intermediate system said identification to determine a public encryption key for said user;

generating a challenge by said network for said user;

presenting said challenge from said network intermediate system to said user;

receiving from said user at said network intermediate system a response to said challenge, said response generated at said user by operating on said challenge using a private key supplied by said user;

verifying via said network intermediate system said response by performing a processing operation on said response and said challenge using said public key associated with said user;

authenticating said user via said network intermediate system only if said verifying indicates that said private key corresponds to said public key;

computing a response at a physically identified end system from said challenge, said response requiring a user to supply a private key at said end system said step of computing requiring a human user to supply at said end system a private key that is stored on a physical device that must be present at said end system, and once said user is authenticated, allowing data packets to be transmitted or received by said user without including user identification or port identification information in said data packets and without requiring said network intermediate system to create and maintain an association between said user and a corresponding port of said packet switched network.

2. The method according to claim 1 wherein said step of requesting comprises requesting an identification to be supplied by a user said identification possibly shared with or passed from other login routines.

3. The method according to claim 1 wherein said step of requesting comprises prompting a user for a user name.

4. The method according to claim 1 wherein said step of using said identification comprises passing said identification to a security server to determine a public key for said user.

5. The method according to claim 1 wherein said step of using said identification comprises using said identification to look up a certificate in a table stored in a first network resource and decoding that certificate via a second network resource to determine a public key for said user.

6. The method according to claim 1 wherein said step of using comprises using said identification to look up a certification path in a table stored in a first network resource and decoding that certification path via a second network resource to retrieve said public key.

7. The method according to claim 1 wherein said step of using said identification comprises transmitting an identification from said networ intermediate system to a directory server, said directory server retrieving a certificate that corresponds to said identification and returning said certificate to said network intermediate server.

8. The method according to claim 1 wherein said step of using said identification comprises transmitting an identification from said network intermediate system to a directory server, said directory server retrieving a certification path that corresponds to said identification and returning said certification path to said network intermediate server.

9. The method according to claim 1 wherein said step of computing comprises using a private key for said user and public-key/private-key encryption algorith to generate said response.

10. The method according to claim 1 further comprising:

filtering network data to and from said arbitrary port based on the authentication status of the user at that port.

11. The method according to claim 1 wherein said step of generating a challenge comprises generating a random number.

12. The method according to claim 1 wherein said step of generating a challenge comprises using said public key and public-key/private-key encryption algorithm to generate said challenge by encrypting a message, said challenge comprising said encrypted message.

13. The method according to claim 1 wherein said step of verifying comprises comparing said response to an expected response at said intermediate system using a fast compare engine.

14. The method according to claim 1 wherein said step of generating a challenge is performed by a security server.

15. The method according to claim 12 wherein said step of verifying comprises comparing said response to said message.

16. The method according to claim 1 wherein said step of verifying comprises decrypting said response using said public key and comparing the result to said challenge.

17. The method according to claim 16 wherein said decrypting of said response is performed by a security server.

18. A secure hub in a packet switched communication network comprising:

a port state variable containing state for a port indicating whether an end system connected to said port has been authenticated;

an authentication process capable of receiving a user identification from a port and of communicating with network devices in order to receive a public key for said user and challenge data to present to a port, said authentication process allowing data packets to be transmitted or received by said user without including said user identification or port identification information in said data packets and without requiring a network intermediate system to create and maintain an association between said user and a corresponding port of said packet switched communication network, a verification engine for determining if a response is valid by operating on said response and said challenge using said public key and a public key/private key encryption algorithm, said verification engine further adapted to compute a response at a physically identified end system from said challenge, said response requiring a user to supply a private key at said end system said computing of said response requiring a human user to supply at said end system a private key that is stored on a physical device that must be present at said end system; and a controller capable of setting an authentication bit for a port in response to a result from said comparator.

19. The device according to claim 18 further comprising a second state indicating whether at least one port is an unprotected port out of which data from unauthenticated ports may be transmitted.

20. In a packet switched communication network, a method for improving network security comprising:

storing at a first intermediate system to which a network end system connects state indicating whether a network port connecting said intermediate system to an end system is authenticated;

setting said state to an unauthenticated state at intermediate system power up or as programmed by a network manager;

performing an authentication process on an unauthenticated port prior to an unrestricted transmission or reception of network data through said intermediate system to said unauthenticated port said authentication process comprising using a public key/private key encryption algorithm to determine that an end system connected to an unauthenticated port is in possession of a valid private key, said authentication process further adapted to compute a response at said end system from a challenge, said response requiring a user to supply a private key at said end system said computing of said response requiring a human user to supply at said end system a private key that is stored on a physical device that must be present at said end system, said authentication process allowing data packets to be transmitted or received by said user without including a user identification or port identification information in said data packets and without requiring said network intermediate system to create and maintain an association between said user and a corresponding port of said packet switched communication network;

resetting said authentication state to an unauthenticated state whenever an interruption in the physical connection between a port and an end system is detected; and setting said state to an authenticated state only when said authentication process returns a message that authentication has been validated.

21. A packet switched communication network having enhanced security comprising:

an end system interacting with a user;

a state variable containing state indicating whether a connected end system has been authenticated;

a secure hub providing a private connection between said end system and network data and capable of filtering data to said end system based on an authentication state for said end system;

an authentication process capable of receiving a user identification from an end system and capable of retrieving a mechanism for generating a challenge to present to an end system, said authentication process further adapted to compute a response at said end system from said challenge, said response requiring a user to supply a private key at said end system said computing of said response requiring a human user to supply at said end system a private key that is stored on a physical device that must be present at said end system, said authentication process allowing data packets to be transmitted or received by said user without including a user identification or port identification information in said data packets and without requiring a network intermediate system to create and maintain an association between said user and a corresponding port of said packet switched communication network;

a comparator for comparing a response from an end system to a challenge, the validity of said response depending on a secret key being known at said end system; and a controller capable of setting an authentication bit for an end system in response to a result from said comparator.

22. The device according to claim 21 wherein said network is a local area network.

* * * * *